(12) United States Patent
Jin et al.

(10) Patent No.: US 11,015,109 B2
(45) Date of Patent: May 25, 2021

(54) PARTICULATE PROFILE CONTROL AGENT SELF-ADAPTIVE TO SIZE OF FORMATION PORE THROAT AND PREPARATION METHOD THEREOF

(71) Applicant: Southwest Petroleum University, Chengdu (CN)

(72) Inventors: Fayang Jin, Chengdu (CN); Daijun Du, Chengdu (CN); Wanfen Pu, Chengdu (CN); Xiang Li, Chengdu (CN); Ye Ju, Chengdu (CN); Kexing Li, Chengdu (CN); Lin Sun, Chengdu (CN); Rui Liu, Chengdu (CN); Shuyu Song, Chengdu (CN); Mian Wang, Chengdu (CN); Wei Liao, Chengdu (CN); Desheng Qian, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 17/070,943

(22) Filed: Oct. 15, 2020

(65) Prior Publication Data
US 2021/0115317 A1    Apr. 22, 2021

(30) Foreign Application Priority Data
Oct. 16, 2019  (CN) .......................... 201910981477.5

(51) Int. Cl.
| C09K 8/588 | (2006.01) |
| C09K 8/508 | (2006.01) |
| C09K 8/512 | (2006.01) |
| C09K 8/516 | (2006.01) |
| C09K 8/504 | (2006.01) |

(52) U.S. Cl.
CPC .......... *C09K 8/5083* (2013.01); *C09K 8/5045* (2013.01); *C09K 8/512* (2013.01); *C09K 8/516* (2013.01); *C09K 8/588* (2013.01)

(58) Field of Classification Search
CPC ...... C09K 8/5083; C09K 8/512; C09K 8/588; C09K 8/5045; C09K 8/516
See application file for complete search history.

(56) References Cited

U.S. PATENT DOCUMENTS 5,213,446 A  *  5/1993  Dovan ................. E21B 21/068
                                                    166/295

FOREIGN PATENT DOCUMENTS

| CN | 106047324 A  |   | 10/2016 |
| CN | 106566488 A  | * | 4/2017  |
| CN | 106590559 B  | * | 5/2019  |

* cited by examiner

*Primary Examiner* — Kumar R Bhushan

(57) ABSTRACT

A particulate profile control agent self-adaptive to a size of formation pore throat and a preparation method thereof include: raw materials and mass fraction for preparing a system including a main agent of 0.04~0.2%, a nucleating agent of 0.005~0.01%, a crosslinking agent of 0.002~0.04%, an additive of 0.005~0.01% and water. The preparation method includes: adding the main agent in proportion to the water and evenly mixing the mixture of the main agent and the water, and then adding the additive, the crosslinking agent and the nucleating agent in turn so as to form the profile control agent; pumping the profile control agent into the formation to be reacted at a reservoir temperature for a period of time to form colloidal particles on the spot for sealing off a high-permeability layer. The present disclosure is of easy operation and low cost, low initial viscosity and good injectivity.

2 Claims, 4 Drawing Sheets

PARTICULATE PROFILE CONTROL AGENT SELF-ADAPTIVE TO SIZE OF FORMATION PORE THROAT AND PREPARATION METHOD THEREOF

CROSS-REFERENCE TO RELATED APPLICATION

This application claims the benefit of priority from Chinese Patent Application No. 201910981477.5 entitled "PARTICULATE PROFILE CONTROL AGENT SELF-ADAPTIVE TO SIZE OF FORMATION PORE THROAT AND PREPARATION METHOD THEREOF" and filed on Oct. 16, 2019, the content of which is hereby incorporated by reference in its entirety.

BACKGROUND

Technical Field

The present disclosure generally relates to a technical field of oilfield chemistry, in particular to a particulate profile control agent self-adaptive to a size of formation pore throat and a preparation method thereof.

Description of Related Art

After a short period of elastic energy exploitation, oil field enters a stage of replenishment energy development, a water-flooding way is still a preferred technology for an oil field development, a water-flooding stage endowing other functions except for supplementing formation energy has become a hot spot in the world oil industry. After many years of water injection development, the oil field has entered a stage of high water cut and high yields, at the same time, layers of the reservoir have disadvantages of contradictions prominent, serious water channeling and unstable productions. Laboratory research and field tests have proved that the profile control technology is an important strategic technology to improve an oil recovery rate and an injection development effect of water-flooding development oil field, which is mainly used for plugging channels of the water channeling, improving an oil-flooding efficiency, so as to achieve purposes of controlling water, stabilizing production and increasing production.

At present, profile control techniques using gel or particulate profile control agents have been widely used in various oil fields, such two kinds of profile control agents play a very important role in water control and oil stabilization of oil field, but they are deficient in some aspects:

For example, gel-like profile control agents include ontology gels, weak gels and colloidal dispersion gels.

Furthermore, the bulk gel has a certain viscosity. For example, Chinese patent NO. CN102453473 A discloses an organic gel plugging agent for water plugging and profile control, a preparation method and an application thereof, which is composed of a polymer thickener of 0.2~1.5 wt %, a macromolecule crosslinking agent of 0.2~3.0 wt %, a PH regulator of 0.2~1.5 wt % and rest of water. It has characteristics of a selective sealing ability, an adjustable gumming time and an easy usage. However, this kind of agent can become a semi-solid state after it is gelled without entering a deep layer of the formation, so it is only suitable for plugging channels of water-channeling of fracture zones near a well and a high permeable layer.

The weak gel is mainly composed of an intra-molecular crosslinking, supplemented by an inter-molecular crosslinking to form a three-dimensional network structure with a relatively weak crosslinking feature and certain of fluidity. For example, Chinese patent NO. CN102559159 A discloses a profile control and water plugging agent with a high temperature phenolic resin weak gel, which is composed of a partially hydrolyzed polyacrylamide of 0.25%~1.2%, a crosslinking agent of 0.2%~1.0%, an additive of 0.01%~1% and rest of water. It has the characteristics of high temperature resistance more than 90° C., a maximum salinity more than 85000 mg/L, a high gel strength and an adjustable gumming time. However, its preparation process of crosslinking agent phenolic resin is more complicated, and of high concentration of the polymer and the crosslinking agent so it is expensive, and more importantly, its high viscosity of the whole system can't reach the deep fluid flow due to its limited distance into the formation.

The colloidal dispersion gel is a non-three-dimensional network gel system formed by a polymer and a crosslinking agent with low concentration, because of the low concentration of polymers and crosslinking agents, there is less chance of intermolecular collisions, colloidal particles, mainly composed of intermolecular crosslinked polymer molecular line groups, are dispersed in a water medium to form a thermodynamically stable system with gel properties and colloidal properties. For example, Chinese patent NO. CN 103408881 A discloses an organic/inorganic composite colloidal dispersion gel and a preparation method thereof, which is composed of water, an acrylamide polymer, an inorganic crosslinking agent and an organic crosslinking agent. The organic/inorganic composite colloidal dispersion gel has a wide range of temperature application, of a non-toxic cross-linking system, a little environmental impact and a low cost, so as to be suitable for deep profile control and oil-flooding due to good fluidity and a long gumming time. However, it is not suitable for fractures and large orifices, with certain requirements for service temperatures and poor adaptability to reservoirs.

For example, particulate profile control agents include polymer microspheres, bulk swelling particles, flexible particles, etc., which have a good temperature resistance, a salt resistance and a shear resistance by using a pre-crosslinking method.

Polymer microspheres have attracted much attention because of their good injectivity, strong migration ability and good stability. A construction technology of microspheres is simple so that the microspheres can be easily dispersed in aqueous solution and injected into the formation, thereby large pore channels in the formation can be plugged by mechanical trapping and adsorption, etc. For example, Chinese patent NO. CN 105778016 A discloses a polymer microsphere for profile control and water plugging in oil field and a preparation method thereof, which is a spherical structure with three layers being composed of a cationic core, an intermediate oleophylic layer and an outer anionic hydrophilic layer, with a controllable size range of 1~500 m, so that its size after full expansion can reach 30~1500 m, with good expansion performance and strong plugging performance. However, this kind of microsphere also has some disadvantages such as too fast swelling speed and weak plugging ability for large pore channels, especially after the microsphere is migrated into a deep portion of the formation, a strength of the microsphere is easily reduced due to its expansion, its degradation and so on, so that bridging and sealing ability of large pore channels can be weakened. Thus, this kind of microsphere in practical applications is limited.

A particle size of the bulk swelling particle can be adjusted according to different reservoir conditions, and expansion coefficients and strength are less affected by salinity of formation water. For example, Chinese patent NO. CN 105368422 A discloses a pre-crosslinking bulk swelling particle profile control agent and a preparation method thereof, which is composed of 90~100 parts of acrylamide, 2~4 parts of 2-acrylamideoctodecyl sulfonic acid, 2~4 parts of N, N-methylene bisacrylamide, 0.02~0.04 part of ammonium persulfate, 0.08~0.2 part of tetramethylethylenediamine, and 300-400 parts of deionized water. A compressive strength of the profile control agent is greater than 3 MPa after water absorption, and the product has a large compressive strength, with a higher elasticity in the bottom thereof and maintaining a larger particle size thereof, so that it is conducive to plug large pores. However, its injection and deep migration ability is poor due to its large particle size.

Flexible particles can withstand a condition of high temperature and high salt, and have a soft texture after water absorption so as to temporarily plug the formation and then continue to transport by being pressed through deformation. For example, Chinese patent NO. CN 106632835 A discloses a flexible particle for profile control and a preparation method thereof, which is composed of water phase matters and oil phase matters by a weight ratio of 35:65~25:75. In this way, it has the characteristics of a small particle size, a good expansion and salt resistance, a high expansion multiple, high solid content of separation and fast dispersion. However, due to a rapid expansion speed of water absorption, the flexible particles with large particle size also have poor injectivity and are prone to plug in wellbores or near well zones.

After in-depth analysis of advantages and disadvantages of various conventional profile control agents, the present disclosure provides a particulate profile control agent self-adaptive to a size of formation pore throat, the system is prepared to form profile control agents in ground conditions, and cross-linked to form colloidal particles with viscoelasticity under reservoir conditions after it is injected into the formation, which can solve problems of poor injectivity, low gelatinized strength even without being gelatinized after being cut, so that it can't satisfy profile control and oil-flooding at the same time.

To sum up, the profile control agent of the present disclosure is combined advantages of gel profile control agents and particulate profile control agents so as to have dual functions of both the gel profile control agent and the particulate profile control agent.

SUMMARY

The technical problems to be solved: in view of the shortcomings of the related art, the present disclosure relates to a particulate profile control agent self-adaptive to a size of formation pore throat and a preparation method thereof which can solve a problem of water-channeling in a high permeability or high water cut reservoir at a late stage of water-flooding development, with low injection viscosity, and be generated on the spot self-adaptive to a size of formation pore throat after entering a channel of water-channeling, so as to improve the efficiency of water-flooding by a deep flooding.

The technical solution adopted for solving technical problems of the present disclosure is:

A particulate profile control agent self-adaptive to a size of formation pore throat according to an embodiment of the present disclosure includes: raw materials and mass fraction for preparing the particulate profile control agent including:
a main agent of 0.04~0.2%,
a nucleating agent of 0.005~0.01%,
a crosslinking agent of 0.002~0.04%,
an additive of 0.005~0.01%, and
rest of water.

Wherein the main agent is a water-soluble polymer with a molecular weight of 2~15 million, and the water-soluble polymer being polyacrylamide.

Wherein the nucleating agent is a water-soluble or water-insoluble material and selected from one or more combinations of sodium benzoate, aluminum benzoate, nano-silica, nano-calcium carbonate or talc powder.

Wherein the crosslinking agent is selected from one or more combinations of phenolic resin, chromium acetate, aluminum citrate, methylene diacrylamide, hexamethylenetetramine or divinylbenzene.

Wherein the additive selected from one or more combinations of thiourea, sodium thiosulfate, sodium sulfite or hydrazine.

A preparation method of the particulate profile control agent self-adaptive to the size of formation pore throat includes steps following as:

under a condition of continuous stirring, adding a certain amount of water-soluble polymer to clear water, formation water or sewage and stirring a mixture off the water-soluble polymer and the clear water, the formation water or the sewage for 45 to 180 minutes to fully swell and dissolve the polymer, and then adding the additive, the crosslinking agent and then nucleating agent in turn according to their proportions, constantly stirring the mixture thereof to mix evenly, so as to obtain the target profile control agent;

in order to facilitate a relevant research on gel formation and plugging of the profile control agent in a laboratory, sealing the above profile control agent and being reacted at a constant temperature of 30° C. to 90° C. for a period of time to form a gel, obtaining a different gelatinization time according to different synthetic materials and different reaction temperatures.

Selecting an appropriate type of the crosslinking agent, an appropriate concentration of the crosslinking agent and a temperature, to control system polymerization crosslinking time that is a formation time of the colloidal particles, so as to control a migration distance and a plugging layer of the profile control agent.

In the above method, selecting appropriate types of the main agent and the nucleating agent, and appropriate concentrations of the main agent and the nucleating agent, to control a quantity and a size of the colloidal particles formed in the system, so as to optimize the injection performances of the profile control agent and improve the plugging strength of the profile control agent.

An application of the particulate profile control agent self-adaptive to the size of the formation pore throat is provided that, when the profile control agent is directly injected into a core or the formation, the colloidal particles similar in shape and size to the pore are formed in the core or the formation for sealing the core or the formation.

The present disclosure provides the advantages as below.

(1) The present disclosure can achieve a crosslinking reaction of the profile control agent directly in the formation to generate colloidal particles highly matching shapes of pores or fractures of rocks, so that it has a good plugging property to effectively control the water-channeling in a high-permeability layer, so as to plug the channel of water-channeling and change a direction of water-flooding, at the same time, it can improve heterogeneity of oil and gas reservoirs and increase a recovery efficiency of a heterogeneous reservoir;

(2) due to high strength and good elastic deformation characteristics of the colloidal particles, it can continue to move forward after reaching a certain pressure, so as to improve the efficiency of water-flooding by a deep flooding;

(3) the system can provide a simple preparation process for using low requirements for pumping equipments, a safe and reliable operation, a convenient and fast construction, a low construction cost, to achieve an important economic value.

DETAILED DESCRIPTION

Figure 1:
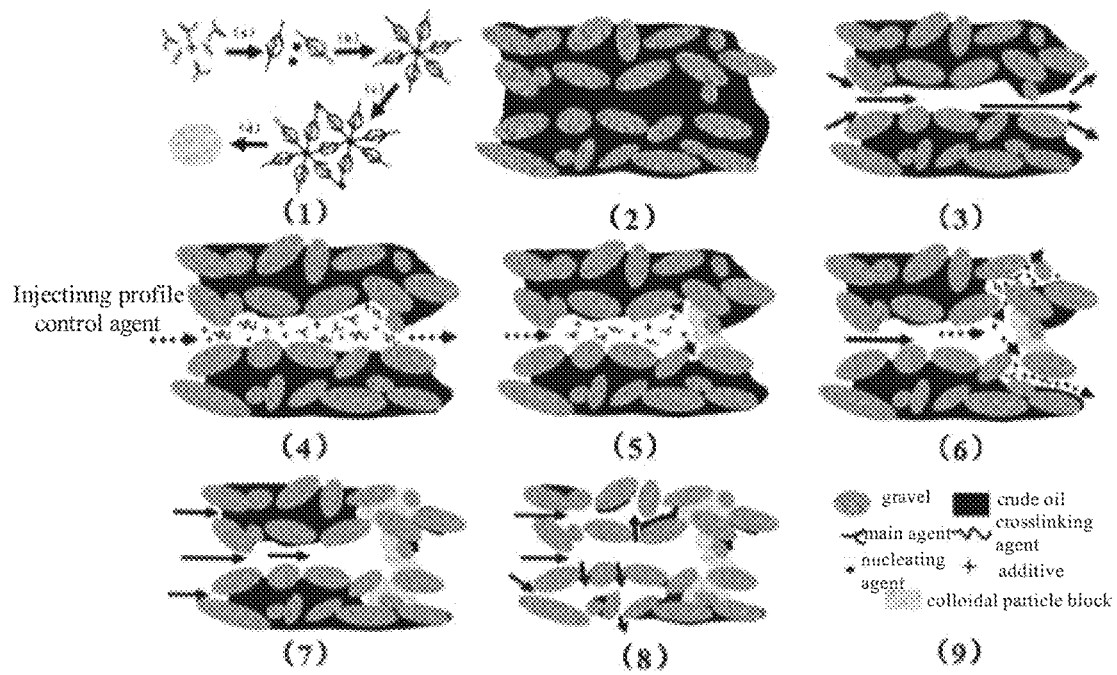
FIG. 1 is a schematic view of a formation and blocking mechanism of a particulate profile control agent self-adaptive to a size of formation pore throat of the present disclosure.

Reference will now be made in detail to embodiments, examples of which are illustrated in the accompanying drawings.

(One) Embodiments

A first embodiment of the present disclosure:

a particulate profile control agent self-adaptive to a size of formation pore throat of the first embodiment includes: raw materials of the profile control agent prepared by a mass percentage including:

a main agent: 0.12% polyacrylamide (molecular weight: 10 million);

a nucleating agent: 0.005% sodium benzoate;

a crosslinking agent: 0.01% aluminum citrate;

an additive: 0.005% thiourea;

the rest is water.

According to proportions of the above raw materials, corresponding drugs are weighed with a stirring speed at 150 rpm, and the polyacrylamide is added to the stirring water slowly in turn, after the polyacrylamide is fully dissolved and dispersed, the sodium benzoate, the aluminum citrate and the thiourea are added successively, and the mixture thereof is continued to be evenly mixed until a target profile control agent is obtained.

A second embodiment of the present disclosure:

a particulate profile control agent self-adaptive to a size of formation pore throat of the second embodiment includes: raw materials of the profile control agent prepared by a mass percentage including:

a main agent: 0.15% polyacrylamide (molecular weight: 8 million);

a nucleating agent: 0.008% nano-silica;

a crosslinking agent: 0.02% water soluble phenolic resin;

an additive: 0.005% hydrazine; and the rest is water.

Firstly, simulated water with degree of mineralization of 100000 mg/L was prepared by water and sodium chloride; and then corresponding drugs are weighed according to proportions of the above raw materials with a stirring speed at 250 rpm, and the polyacrylamide is slowly added to the stirring simulated water; after the polyacrylamide is fully dissolved and dispersed, the hydrazine, the water soluble phenolic resin and the nano-silica are successively added, and the mixture thereof is continued to be evenly mixed until a target profile control agent is obtained.

A third embodiment of the present disclosure:

a particulate profile control agent self-adaptive to a size of formation pore throat of the third embodiment includes: raw materials of the profile control agent prepared by a mass percentage including:

a main agent: 0.15% polyacrylamide (molecular weight: 12 million);

a nucleating agent: 0.008% talcum powder;

a crosslinking agent: 0.015% hexamethylenetetramine;

an additive: 0.005% hyposulphite; and the rest is water.

Firstly, simulated water with degree of mineralization of 100000 mg/L was prepared by water and sodium chloride; and then corresponding drugs are weighed according to proportions of the above raw materials with a stirring speed at 300 rpm, and the polyacrylamide is slowly added to the stirring simulated water; after the polyacrylamide is fully dissolved and dispersed, the hyposulphite, the hexamethylenetetramine and the talcum powder are successively added, and the mixture thereof is continued to be evenly mixed until a target profile control agent is obtained.

A fourth embodiment of the present disclosure:

a particulate profile control agent self-adaptive to a size of formation pore throat of the fourth embodiment includes: raw materials of the profile control agent prepared by a mass percentage including:

a main agent: 0.1% polyacrylamide (molecular weight: 15 million);

a nucleating agent: 0.008% aluminum benzoate;

a crosslinking agent: 0.01% divinylbenzene;

an additive: 0.005% sodium sulfite; and the rest is water.

Firstly, simulated water with degree of mineralization of 50000 mg/L was prepared by water and sodium chloride; and then corresponding drugs are weighed according to proportions of the above raw materials with a stirring speed at 200 rpm, and the polyacrylamide is slowly added to the stirring simulated water; after the polyacrylamide is fully dissolved and dispersed, the sodium sulfite, the divinylbenzene and the aluminum benzoate are successively added, and the mixture thereof is continued to be evenly mixed until a target profile control agent is obtained.

(Two) Performance Test

1. Viscosity Test

The profile control agent of the first embodiment is placed in a constant temperature air blast drying oven with a temperature of 70° C. for heating, by a Brookfield DV-III type rotary viscosimeter for testing viscosities: an initial viscosity of the profile control agent, system viscosities after being reacted for 3 days, 30 days and 60 days, and a viscosity of separation solution after the colloidal particles is filtered out. Test results are shown in Table 1.

TABLE 1

Viscosity test results of the profile control agent

|  |  | 3 days | | 30 days | | 60 days | |
| --- | --- | --- | --- | --- | --- | --- | --- |
| fluid | initial | colloidal particle system | separation solution | colloidal particle system | separation solution | colloidal particle system | separation solution |
| Viscosity mPa · s | 5.12 | 21.03 | 1.66 | 17.31 | 1.59 | 15.24 | 1.36 |

The above viscosity test results are indicated that the viscosity of the profile control agent in a completion configuration is smaller than that of the conventional profile control agent so as to be more conducive to be pumped. The profile control agent is provided by the embodiment of the present disclosure so that crosslinking polymerization reaction can be occurred within 2~3 days at a high temperature of 70° C. In this way, the resulting colloidal particles can increase the viscosity of the system still with certain fluidity, while, the viscosity of the separation solution after the colloidal particles are filtered is low and close to water. Under high temperature aging for a long time, the viscosity is decreased less so as to show a good thermal stability.

2. Gelatinizing Time Test

Concentrations of the crosslinking agent of the first embodiment (the aluminum citrate), the crosslinking agent of the second embodiment (the water-soluble phenolic resin), and the crosslinking agent of the third embodiment (the hexamethylenetetramine) are respectively changed, while, their respective remaining compositions and preparation methods are unchanged. The prepared profile control agent is sealed and then received in a constant temperature air blast drying oven with a set temperature of 70° C. for heating. Every a period of time, the generation of colloidal particles of the profile control agent under different concentrations of the crosslinking agent can be observed, and test results are shown in Table 2

TABLE 2 formation time of colloidal particles of the profile control agent

|  |  | concentration of the crosslinking agent % | formation time of colloidal particles/h |
| --- | --- | --- | --- |
| Embodiment 1 | aluminum citrate | 0.005 | 150~200 |
|  |  | 0.008 | 100~120 |
|  |  | 0.01 | 60~70 |
|  |  | 0.012 | 45~50 |
|  |  | 0.015 | 24~30 |
| Embodiment 2 | water soluble phenolic resin | 0.005 | 165~170 |
|  |  | 0.01 | 120~135 |
|  |  | 0.015 | 83~90 |
|  |  | 0.02 | 44~60 |
|  |  | 0.025 | 24~30 |

TABLE 2-continued formation time of colloidal particles of the profile control agent

|  |  | concentration of the crosslinking agent % | formation time of colloidal particles/h |
| --- | --- | --- | --- |
| Embodiment 3 | Hexamethylenetetramine | 0.005 | 144~155 |
|  |  | 0.01 | 90~112 |
|  |  | 0.015 | 63~75 |
|  |  | 0.02 | 36~40 |
|  |  | 0.03 | 18~22 |

The above test results are indicated that the reaction time of the profile control agent provided in the embodiment to generate colloidal particles is different under different crosslinking agent types and concentrations, therefore, profile control agents with a controllable reaction time can be designed for different reservoirs.

3. Observation of Gelatinization Forms of Adjustable Flooding Agents

Figure 2:
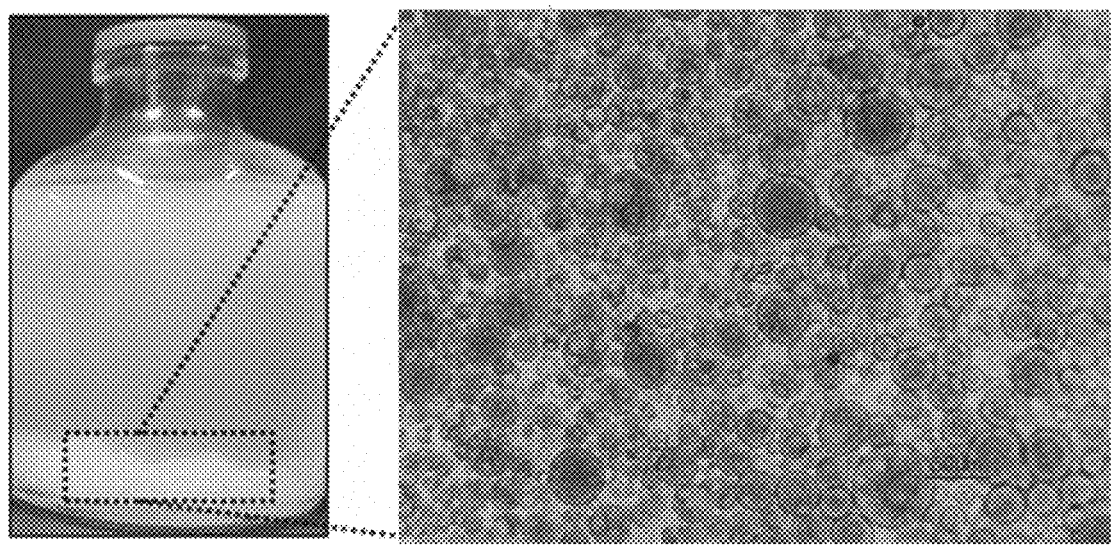
FIG. 2 is a schematic view of a macroscopic image of colloidal particles and a microscopic image under an optical microscope of a first embodiment of the present disclosure.
Figure 3:
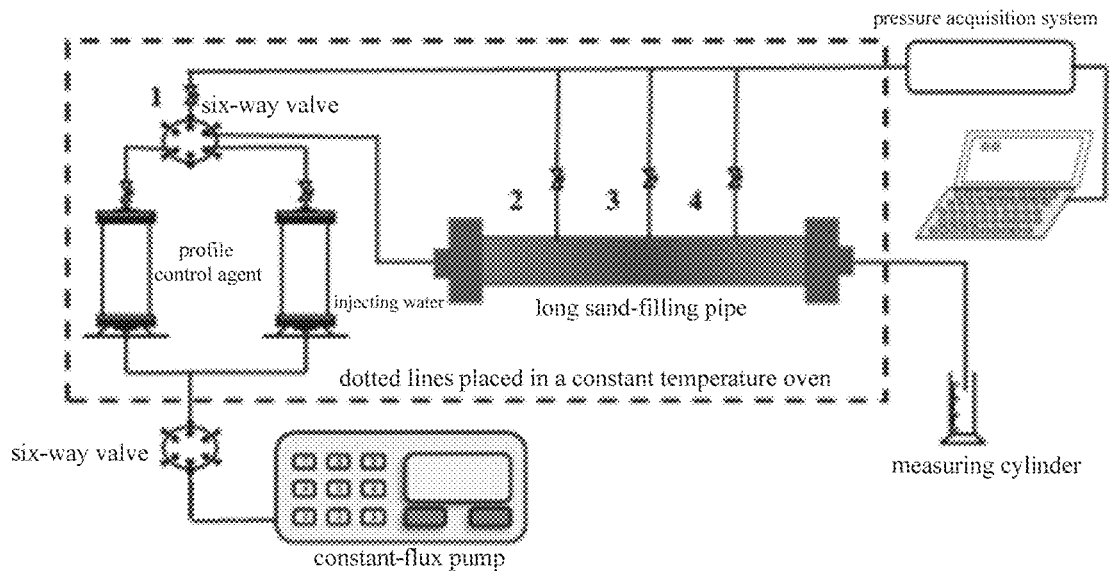
FIG. 3 is a schematic view of an experimental device for testing injection performances of the profile control agent of the present disclosure, and numerals 1, 2, 3, 4 shown in FIG. 3 respectively represented pressure monitoring points.

The profile control agent of the first embodiment is taken to be sealed in a bottle and then heated in a constant temperature air blast drying oven with a set temperature of 70° C., after a period of time, it can be reacted to form a profile control agent with colloidal particles so that colloidal particles can be observed microscopically. Macroscopic images of the colloidal particles formed by a reaction and microscopic images of the colloidal particles under an optical microscope are shown in FIG. 2. It can be seen in FIG. 2 that the colloidal particles are opalescent with soft texture and certain elasticity, and most of the colloidal particles are cemented together to form a group and deposited at the bottom of the system. When a small piece is observed under the optical microscope, it is found that spherical particles with a particle size of several microns are gathered together to form a large piece of colloidal particles.

4. Injection Performance Test of the Profile Control Agent

A sand-filling pipe with a length of 100 cm, a diameter of 2.5 cm and three pressure measuring points is selected. 40~70 mesh size of quartz sand is filled and then compacted, the sand-filling pipe is vacuumized with saturated water and placed in a thermostat with a temperature of 70° C. for a primary water-flooding at a flow rate of 1 mL/min to a stable pressure, and then permeability of the sand-filling pipe is measured. The profile control agent prepared in the first embodiment is injected into the sand-filling pipe at a flow rate of 1 mL/min, and then the sand-filling pipe is sealed at both ends thereof and aged for more than 72 hours in the thermostat at a temperature of 70° C., finally, a secondary water-flooding is occurred at a flow rate of 1 mL/min to record changes of different pressure measuring points with the injection volumes in each stage.

Figure 4:
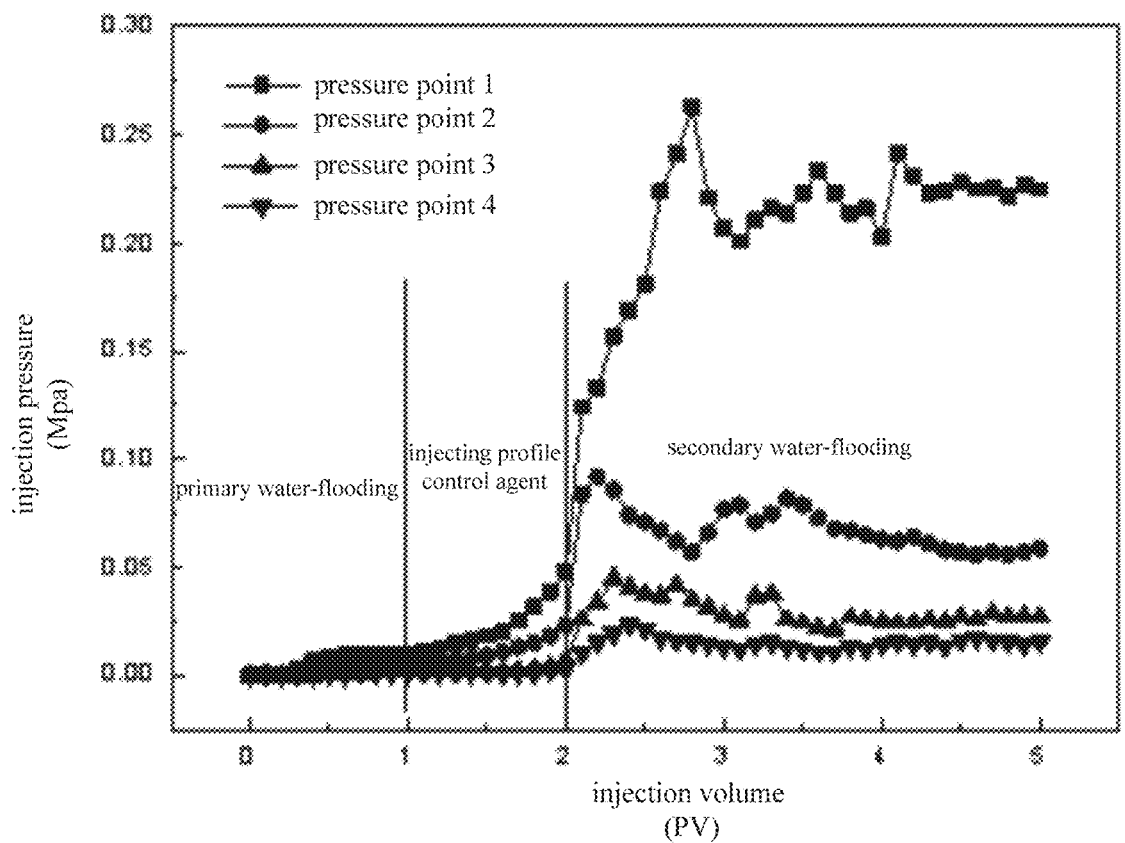
FIG. 4 is a schematic view of a pressure change curve of the profile control agent in the process of injection and deep migration.
Figure 5:
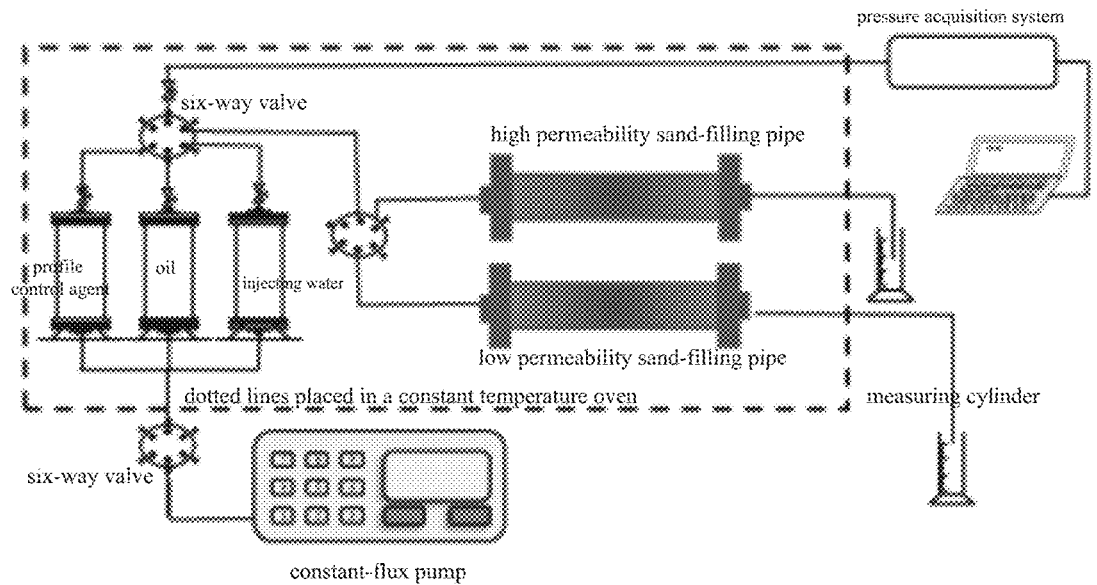
FIG. 5 is a schematic view of an experimental device for profile control performances of the profile control agent in a non-homogeneous formation.

It can be seen from curves shown in FIG. 4, that when the profile control agent is injected, pressure changes of each pressure measuring point is unobvious, which is indicated that the un-reacted profile control agent has a low viscosity and a good injectability. After the profile control agent is aged for 72 hours, the colloidal particles are formed to form a plugging in the sand-filling pipe, and a pressure of the secondary water-flooding is increased significantly. With the increase of injection amount of the profile control agent, a pressure of each pressure measuring point is fluctuated up and down, which is indicated that the colloidal particles with high matched-degree are formed in the pores of the quartz sand grains, and then migrated to a depth due to elastic deformation, so as to form a plugging step by step.

5. Profile Control Performance Test

A sand-filling pipe with a length of 50 cm and a diameter of 2.5 cm is selected and filled by 40~70 mesh size of quartz sand and then compacted, the sand-filling pipe is vacuumized with saturated water and placed in a thermostat with a temperature of 70° C. for a primary water-flooding at a flow rate of mL/min to a stable pressure, and then permeability of two sand-filling pipes are respectively measured. Two sand-filling pipes with permeability of 1000 mD and 100 mD combined with each other are selected to simulate saturated oil, and then perform a primary water-flooding at a flow rate of mL/min. And, the profile control agent prepared in the first embodiment is injected into the sand-filling pipe to seal the sand-filling pipe at both ends thereof and aged for more than 72 hours in the thermostat at a temperature of 70° C., finally, a secondary water-flooding is occurred at a flow rate of 1 mL/min to record changes of pressures and liquid yield of high and low permeability sand-filling pipes with the injection volumes in each stage.

Figure 6:
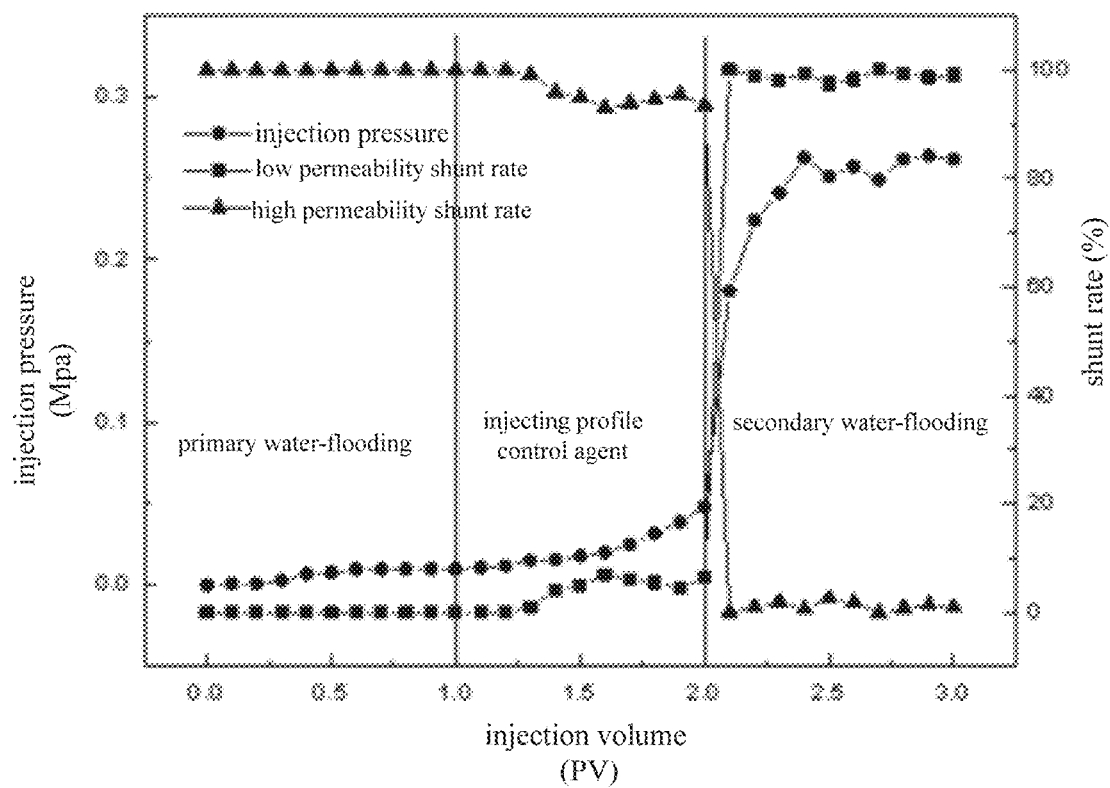
FIG. 6 is a schematic view of a flow rate change curve of the non-homogeneous formation under an action of the profile control agent.
Figure 7:
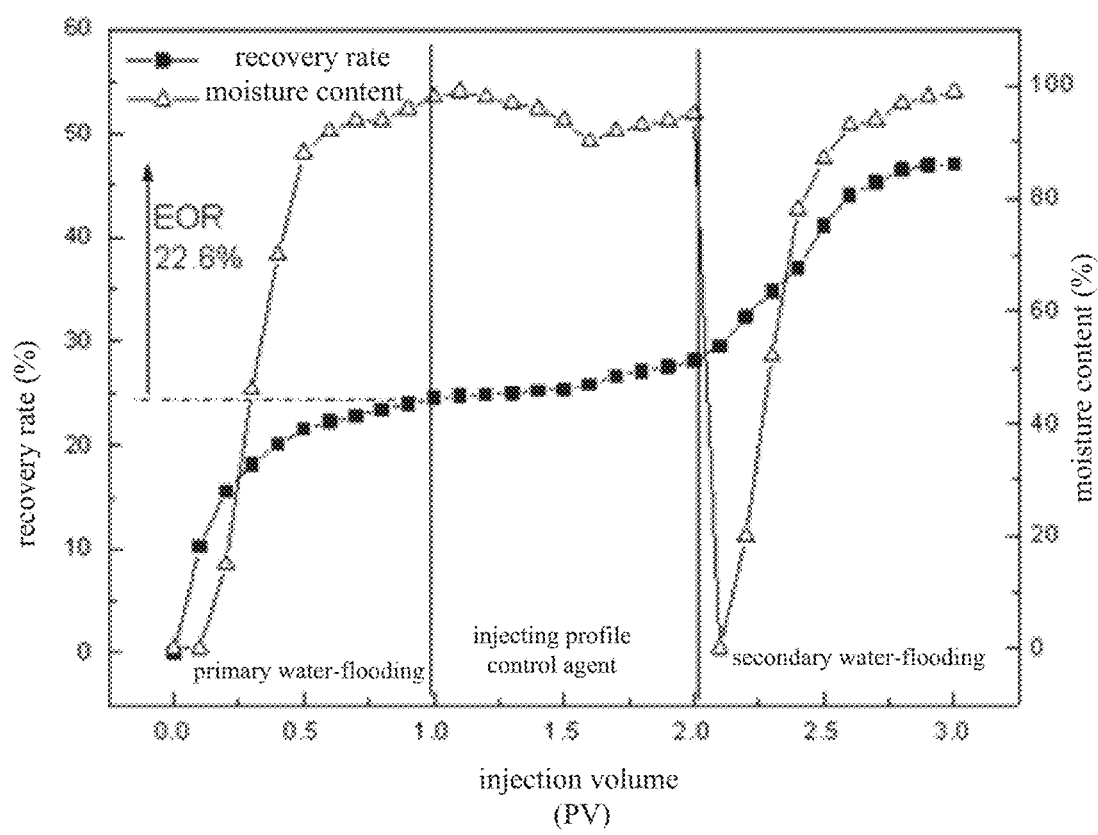
FIG. 7 is a schematic view of a change curve of recovery and water content of the non-homogeneous formation under the action of the profile control agent.

It can be seen in FIG. 6 and FIG. 7, due to serious heterogeneity, the sand-filling pipe with low permeability in the primary water-flooding stage can't produce liquid so that the water content is risen rapidly; after the profile control agent with low viscosity is injected, its pressure is risen slightly and a small amount of liquid is discharged from the sand-filling pipe with the low permeability; and then, after it is aged for 72 hours, colloidal particles are formed strong plugging in the high permeability sand-filling pipe, which made the secondary water-flooding liquid flow to the low-permeability sand-filling pipe to expand swept volumes, thereby oil recovery of the low permeability sand-filling pipe can be improved. As it can be seen from FIG. 6 and FIG. 7, a final recovery IS increased by 22.6%, which has a high application value.

From the above five performance test results can be known, the new type particulate profile control agent self-adaptive to a size of a formation pore throat of the present disclosure has advantages of a simple construction, a low cost and a good injection performance, and colloidal particles are formed in the stratum with strong blocking property, good viscoelasticity, deep migration ability, and good temperature and salt tolerance stability, finally, it can have effects of water control and profile control, expanding swept volumes and improving oil recovery in high water cut or strong heterogeneous reservoirs.

FIG. 1 is shown a mechanism of the new type particulate profile control agent self-adaptive to a size of a formation pore throat of formation, migration, plugging and liquid flow in the formation:

Referring to FIG. 1 (1), the formation process of colloidal particles is: under the influence of additives, high polymer chains of the main agent are connected by cross-linking agents to form pair-wise complexes. Subsequently, a plurality of complexes are gathered around the nucleating agent, and one end of the plurality of complexes is bound to the nucleating agent to form a spherical particle, and the other end of the polymer complex on the spherical particle can also be combined with the nucleating agent. In this way, multiple spherical particles are connected with each other and expanded to form larger colloidal particles;

Also referring to FIG. 1 (2) and FIG. 1 (3), in the original formation, pores are different in size and therefore permeability distribution is uneven, so, in the process of water-flooding development, water flow is preferentially entered into large channels to form a superior channel of high permeability. At this time, the new profile control agent is injected and first laid along the superior channel of high seepage flow, and after a period of time, it is affected by a formation temperature, and then the new profile control agent is adsorbed on a rock surface to gradually form colloidal particles with the nucleating agent as a center in the pores to plug the superior channel of high seepage flow, as shown in FIG. 1 (4) and FIG. 1 (5). The injected fluid turned its flow direction to sweep oil out of untouched areas ad form new colloidal particles to plug in a next large pore, as shown in FIG. 1 (6) and FIG. 1 (7). When high permeability areas are plugged by colloidal particles, a subsequent water-flooding scope is further expanded, thereby oil in low permeability areas are driven out, as shown in FIG. 1 (8). When a water-flooding pressure is gradient increased to a certain extent, the colloidal particles is generated elastic deformation and then migrated to the depth, resulting in plugging in a next pore.

The foregoing description is not in any form a limitation to the present disclosure. Although the features and elements of the present disclosure are described as embodiments in particular combinations, but not intended to limit the protection scope of the present disclosure. Any variation or replacement made by one of ordinary skill in the related art without departing from the spirit of the present disclosure shall fall within the protection scope of the present disclosure.

What is claimed is:

1. A particulate profile control agent self-adaptive to a size of formation pore throat comprising: calculated according to a mass percentage, a main agent of 0.04~0.2%, a nucleating agent of 0.005~0.01%, a crosslinking agent of 0.002~0.04%, an additive of 0.005~0.01%, and rest of water, and wherein the main agent is a water-soluble polymer with a number average molecular weight of 2~15 million, and wherein the water-soluble polymer is polyacrylamide;

the nucleating agent selected from at least one of sodium benzoate, aluminum benzoate, nano-silica, nano-calcium carbonate or talc powder;

the crosslinking agent selected from at least one of phenolic resin, chromium acetate, aluminum citrate, methylene diacrylamide, hexamethylenetetramine or divinylbenzene; and the additive selected from at least one of thiourea, sodium thiosulfate, sodium sulfite or hydrazine.

2. A preparation method of the particulate profile control agent self-adaptive to the size of formation pore throat as claimed in claim 1, wherein the method comprises steps following as:

step 1, slowly adding the main agent to the water and continuously stirring for 45~180 minutes at a stirring speed of 150~300 rpm so as to obtain a uniform solution;

step 2, slowly adding the additive, the crosslinking agent and the nucleating agent to the uniform solution obtained in the step 1 while slowly stirring the uniform solution, and then continuously stirring a mixture thereof until the mixture is evenly mixed to obtain the particulate profile control agent.

\* \* \* \* \*